April 27, 1926.
C. A. PARSONS ET AL
1,582,427
DYNAMO ELECTRIC MACHINERY
Filed Dec. 19, 1923    2 Sheets-Sheet 1
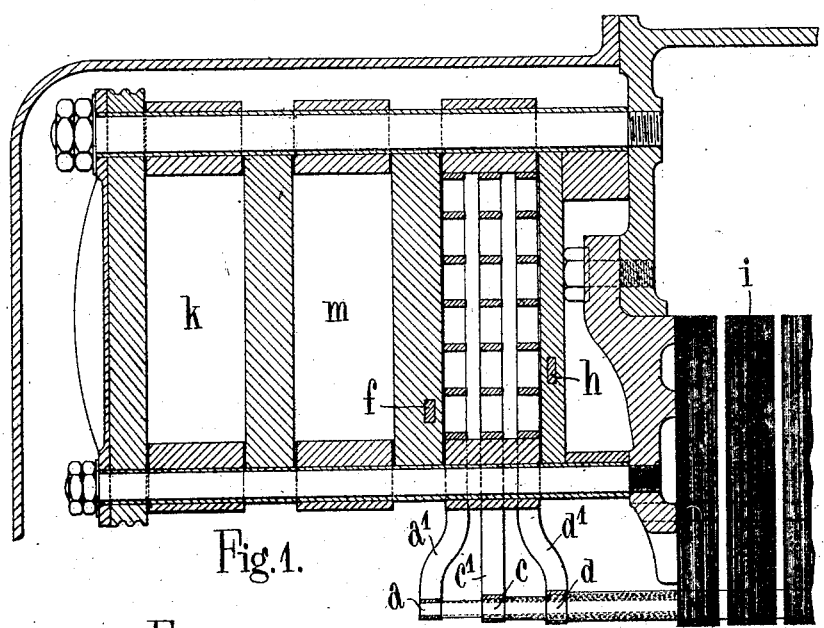
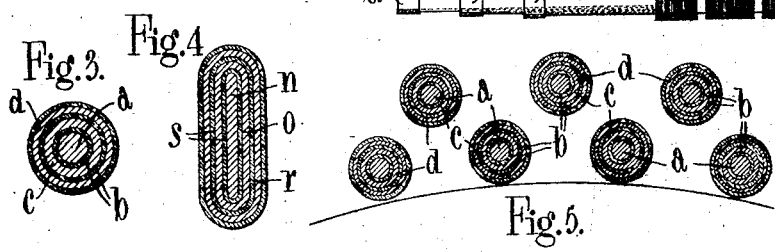
INVENTORS:
CHARLES A. PARSONS
JESSEL ROSEN
by Spear, Middleton, Donaldson, Hall
Attys.

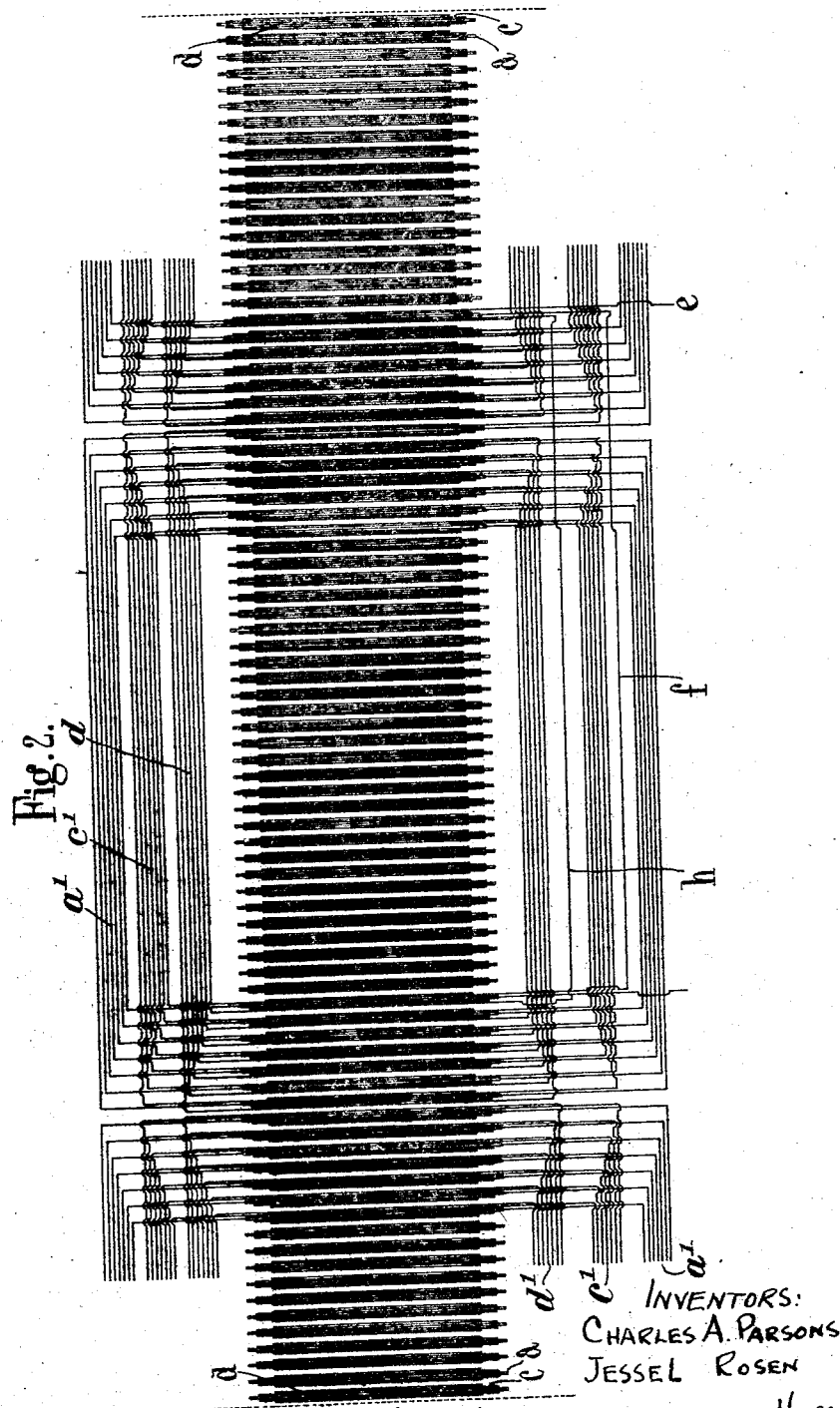

Patented Apr. 27, 1926.

1,582,427

UNITED STATES PATENT OFFICE.

CHARLES ALGERNON PARSONS AND JESSEL ROSEN, OF NEWCASTLE-UPON-TYNE, ENGLAND; SAID ROSEN ASSIGNOR TO SAID PARSONS.

DYNAMO-ELECTRIC MACHINERY.

Application filed December 19, 1923. Serial No. 681,554.

*To all whom it may concern:*

Be it known that we, CHARLES ALGERNON PARSONS and JESSEL ROSEN, both subjects of the King of Great Britain and Ireland, and both residing at Heaton Works, Newcastle-upon-Tyne, in the county of Northumberland, England, have invented certain new and useful Improvements in and Relating to Dynamo-Electric Machinery, of which the following is a specification.

The invention relates to improvements in dynamo-electric machinery and particularly to high-voltage alternating-current generators, motors and the like.

According to present practice, alternators are rarely constructed to operate at voltages higher than about 14,000 volts between phase terminals since with high voltages difficulties arise in connection with the insulation itself which has to be increased to a great extent so that the dimensions and weight of the plant become excessive; in consequence it is usual to design the alternators for a comparatively low voltage and to use static transformers to step up to the higher voltages necessary for transmission.

A main object of the present invention is to provide a construction of alternator or the like which can safely generate currents of higher voltages than now usual, while keeping the size and weight of the machine comparatively low.

To this end, the invention consists in the novel construction hereinafter described and more particularly pointed out in the claims.

Referring to the accompanying drawings:—

Figure 1 shows part of an alternator embodying one form of the present invention.

Figure 2 being a developed diagram of connections;

Figure 3 shows a cross-section through a form of round conductor for use in the present invention, Figure 4 being a similar view of an elongated conductor, while Figure 5 shows an arrangement of staggered slots.

Where desirable corresponding parts in the different figures are indicated by the same reference letters.

In carrying the invention into effect according to one form, the conductors as a whole may be of circular cross-section as seen in Figures 1, 2 and 3, and consist of a central core, $a$, carrying the higher voltage, surrounded, with intervening insulation, $b$, by a pair of conductor tubes, $c$ and $d$, successively carrying lower voltages.

In Figure 1, the stator laminations are shown at $i$, the conductors, $a$, $c$, $d$, concentrically arranged being brought together out of their slots and connected by the end windings, $a'$, $c'$, $d'$, each slot having three such end windings. Only the windings of one phase are shown in Figure 1, the end windings of the other phases being accomodated in the spaces, $k$ and $m$.

In the form illustrated, the inner cores, $a$, of the various conductors in each phase (see Figure 2) are connected in series by the end windings $a'$, and are then connected by the cross-connection, $f$, to the surrounding conductor tubes, $c$, which are again connected in series by the end windings $c'$, and so by way of the cross-connection, $h$, to the outer conductor tubes, $d$, which are likewise connected in series by the end windings $d'$ and then connected to a neutral point such as the star or earth end of the winding as indicated at $e$.

The voltage between adjacent conductors and between the outer conductor and earth is thus kept at a low figure so that the necessary thickness of insulation and length of leakage surface can be provided without unduly increasing the dimensions of the plant.

The connections shown in Figure 2 are those of one phase of a three-phase two-pole alternator having 84 slots and three concentric conductors per slot.

The following illustrative figures in relation to such a design are given by way of example to make clearer the nature of the invention:—

A three-phase alternator wound for 20,000 volts between phase terminals may be conveniently built with 84 slots and three conductors per slot; the winding of each phase will then be distributed between 28 slots or 84 conductors, the voltage generated per conductor being 137. The inner conductors of the 28 slots will consist of the high voltage conductors from 11,500 to 7,810 volts; the middle conductors those from 7,670 to 3,970 and the outer conductors those from 3,830 volts to zero. With such a design there will be a substantially constant potential difference in the neighbourhood of 3,830 volts between the conductors in any one slot and a maximum voltage from the outer conductor to earth of 3,830 volts. Such voltages are quite moderate and can be readily dealt with according to present practice.

According to a modification of the invention, the conductor as a whole, as shown in Figure 4, may be of elongated section with semi-circular ends, the core, $n$, in this case conveniently taking the form of a strip or laminated construction enclosed within conductors, $o$, $r$, having the shape of flattened tubes, which may also be laminated, intervening insulation, $s$, being provided as before. The lamination of the conductors preferably takes the form of insulated wires spiralled in one or more layers, but any other suitable design may be used.

In addition the conductors according to the present invention may in some cases be arranged in two or more rows in staggered relation, as shown in Figure 5, such an arrangement being specially convenient for high-tension machines. By staggering the slots, the reactance of the alternators is increased, while it is possible, instead of the elongated conductor, to use the cheaper form of round conductor.

The staggering of the slots also gives a uniform distribution of winding and in effect it has the advantages of the smooth core armature with the windings wound on the surface, without the very large air gap; the disadvantage of the increase in excitation with the larger air gap is therefore eliminated.

The end windings may be arranged in any other suitable manner to obtain the desired concentric position of the conductors in their slots; e. g. the complete conductor bars or tubes one within the other may be brought out together to form the similarly constructed end connectors, cross-connections being provided as above.

In addition the slots may be of any shape and either semi-open or completely open as desired.

In some cases to minimize loss and obtain lower and more uniform temperature rises of the conductors, the concentric conductors may be made of different cross-sectional areas, the innermost conductor having the greatest area.

The invention is applicable not only to alternating current generators and motors, but also to rotary converters, direct current generators and motors, transformers and other forms of electrical apparatus.

It is an advantage arising from the present invention that the electrical stresses in the insulating material are uniformly distributed over the cross-section of the insulation and the difficulties encountered in this connection with very high potentials are thus eliminated.

It should be understood, however, that the invention is not applicable to high voltages only, as in certain circumstances it may be advantageously applied also to low voltages.

Although particular constructions have been described above with a view to making clear the nature of the invention, the scope of the latter is sufficiently wide to include other constructional forms of concentric cables, slot arrangements and end windings, so long as no departure is made from the underlying principles of the invention set forth above.

Having now described our invention what we claim as new and desire to secure by Letters Patent:—

1. A winding for electrical apparatus comprising in combination, a plurality of conductors nested one within the other carrying voltages stepped down from within outwards, layers of insulating material between and around said conductors, means for connecting said conductors in series, and means connecting one end of the outermost conductor to a neutral point, as set forth.

2. A compound electrical conducting element comprising in combination a plurality of conductors nested one within the other, the voltage in said conductors being stepped down from within outwards, layers of insulating material between and around said conductors, means for connecting the conductors in series to form a plurality of circuits, means for connecting the said circuits in series to form a single winding, and means connecting one end of the outermost conductor to a neutral point, as set forth.

3. Windings for a three-phase dynamoelectric alternator, the winding for each phase comprising in combination a plurality of conductors nested one within the other carrying voltages stepped down from within outwards, layers of insulating material between and around said conductors, means for connecting said conductors in series and means connecting one end of the outermost conductor to a neutral point, as set forth.

4. In a dynamo electric machine the combination comprising an armature having a plurality of slots therein, a plurality of conductors nested one within the other arranged in said slots, the voltage in said conductors being stepped down from within outwards, layers of insulating material between and around said conductors, means for connecting the conductors together in series to form separate sets of windings equal in number to the number of conductors in any slot, and means for connecting all said separate windings in series as set forth.

5. A compound electrical conducting element comprising in combination, a plurality of conductors nested one within the other, certain of which are tubular, layers of insulating material between and around said conductors, and means for connecting in series each conductor with its next adjacent conductor to form a single series winding carrying voltages stepped down from within outwards, as set forth.

In testimony whereof we have signed our names to this specification.

CHARLES ALGERNON PARSONS.
JESSEL ROSEN.